United States Patent
Yao

(10) Patent No.: US 7,471,490 B2
(45) Date of Patent: Dec. 30, 2008

(54) MICRO-ACTUATOR INCLUDING U-SHAPED FRAME AND METAL SUPPORT FRAME, AND MANUFACTURING METHOD THEREOF

(75) Inventor: MingGao Yao, DongGuan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 406 days.

(21) Appl. No.: 11/384,404

(22) Filed: Mar. 21, 2006

(65) Prior Publication Data
US 2007/0223145 A1    Sep. 27, 2007

(51) Int. Cl.
G11B 5/56    (2006.01)
(52) U.S. Cl. .................................................. 360/294.4
(58) Field of Classification Search ............. 360/294.4; 29/25.35
See application file for complete search history.

(56) References Cited

U.S. PATENT DOCUMENTS

| | | | |
|---|---|---|---|
| 5,299,081 | A | 3/1994 | Hatch et al. |
| 5,611,707 | A | 3/1997 | Meynier |
| 5,636,089 | A | 6/1997 | Jurgenson et al. |
| 5,898,544 | A | 4/1999 | Krinke et al. |
| 6,198,606 | B1 | 3/2001 | Boutaghou et al. |
| 6,538,836 | B1 | 3/2003 | Dunfield et al. |
| 6,617,763 | B2 | 9/2003 | Mita et al. |
| 6,624,984 | B2 | 9/2003 | Lewis et al. |
| 6,671,131 | B2 | 12/2003 | Kasajima et al. |
| 6,700,727 | B1 | 3/2004 | Crane et al. |
| 6,700,749 | B2 | 3/2004 | Shiraishi et al. |
| 6,950,266 | B1 | 9/2005 | McCaslin et al. |
| 2003/0147177 | A1 | 8/2003 | Yao et al. |
| 2003/0147181 | A1 | 8/2003 | Shiraishi et al. |
| 2003/0168935 | A1 | 9/2003 | Ogawa et al. |
| 2005/0013056 | A1* | 1/2005 | Kuwajima et al. ....... 360/294.4 |
| 2006/0023338 | A1 | 2/2006 | Sharma et al. |

(Continued)

FOREIGN PATENT DOCUMENTS

JP    2002-74871    3/2002

(Continued)

OTHER PUBLICATIONS

U.S. Appl. No. 11/238,998, filed Sep. 2005, Yang et al.

(Continued)

*Primary Examiner*—Tianjie Chen
(74) *Attorney, Agent, or Firm*—Nixon & Vanderhye P.C.

(57) ABSTRACT

A micro-actuator for a head gimbal assembly includes a U-shaped frame and a metal support frame. The U-shaped frame includes a bottom support, a pair of side arms extending from the bottom support, and a PZT element mounted to each of the side arms. Each PZT element is excitable to cause selective movement of the side arms. The metal support frame includes a top support adapted to support a slider, a bottom support adapted to be connected to a suspension, and a pair of side arms that interconnect the bottom support and the top support. The metal support frame is mounted to the U-shaped frame such that the side arms of the metal support frame are mounted to respective side arms of the U-shaped frame and the bottom support of the metal support frame is mounted to the bottom support of the U-shaped frame.

21 Claims, 14 Drawing Sheets

U.S. PATENT DOCUMENTS

| | | | |
|---|---|---|---|
| 2006/0050442 | A1 | 3/2006 | Yao et al. |
| 2006/0072247 | A1 | 4/2006 | Yao et al. |
| 2006/0082917 | A1 | 4/2006 | Yao et al. |
| 2006/0098347 | A1 | 5/2006 | Yao et al. |
| 2006/0146449 | A1 | 7/2006 | Yao et al. |
| 2007/0000110 | A1* | 1/2007 | Yao .......................... 29/25.35 |
| 2007/0109689 | A1* | 5/2007 | Yao .......................... 360/294.4 |
| 2007/0139824 | A1* | 6/2007 | Yao .......................... 360/294.4 |
| 2007/0139825 | A1* | 6/2007 | Yao et al. ................. 360/294.4 |
| 2007/0153429 | A1* | 7/2007 | Yao et al. ................. 360/294.4 |
| 2007/0188931 | A1* | 8/2007 | Yao .......................... 360/294.4 |

FOREIGN PATENT DOCUMENTS

| | | |
|---|---|---|
| JP | 2002-133803 | 5/2002 |

OTHER PUBLICATIONS

U.S. Appl. No. 11/169,019, filed Jun. 2005, Yao et al.
U.S. Appl. No. 11/080,659, filed Mar. 2005, Yao et al.
U.S. Appl. No. 11/050,823, filed Jan. 2005, Yao et al.
U.S. Appl. No. 11/080,657, filed Mar. 2005, Zhu et al.
U.S. Appl. No. 11/235,549, filed Sep. 2005, Yao et al.
U.S. Appl. No. 11/304,623, filed Dec. 2005, Yao et al.
U.S. Appl. No. 11/169,003, filed Jun. 2005, Yao et al.
U.S. Appl. No. 11/125,248, filed May 2005, Yao et al.
U.S. Appl. No. 11/263,998, filed Nov. 2005, Yao.
U.S. Appl. No. 11/265,385, filed Nov. 2005, Yao et al.
U.S. Appl. No. 11/192,121, filed Jul. 2005, Yao et al.
U.S. Appl. No. 11/304,544, filed Dec. 2005, Yao.
U.S. Appl. No. 11/300,339, filed Dec. 2005, Yao et al.
U.S. Appl. No. 11/385,704, filed Mar. 2006, Yao et al.
U.S. Appl. No. 11/385,698, filed Mar. 2006, Yao et al.
U.S. Appl. No. 11/319,577, filed Dec. 2005, Yao et al.
U.S. Appl. No. 11/353,018, filed Feb. 2006, Yao.
U.S. Appl. No. 11/273,075, filed Nov. 2005, Yao.
U.S. Appl. No. 11/319,580, filed Dec. 2005, Yao et al.
U.S. Appl. No. 11/414,546, filed May 2006, Yao et al.
U.S. Appl. No. 11/440,354, filed May 2006, Li.

* cited by examiner

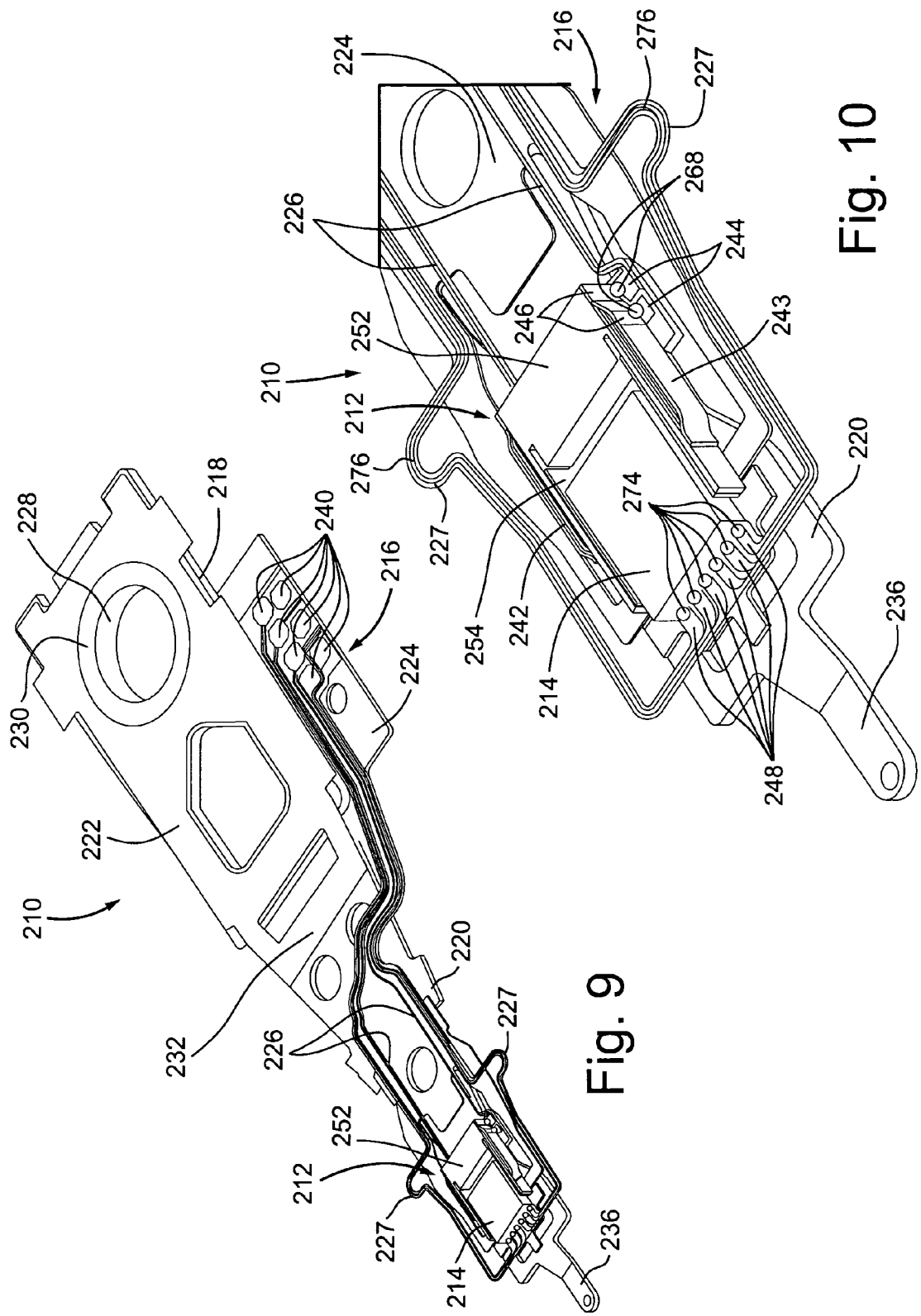

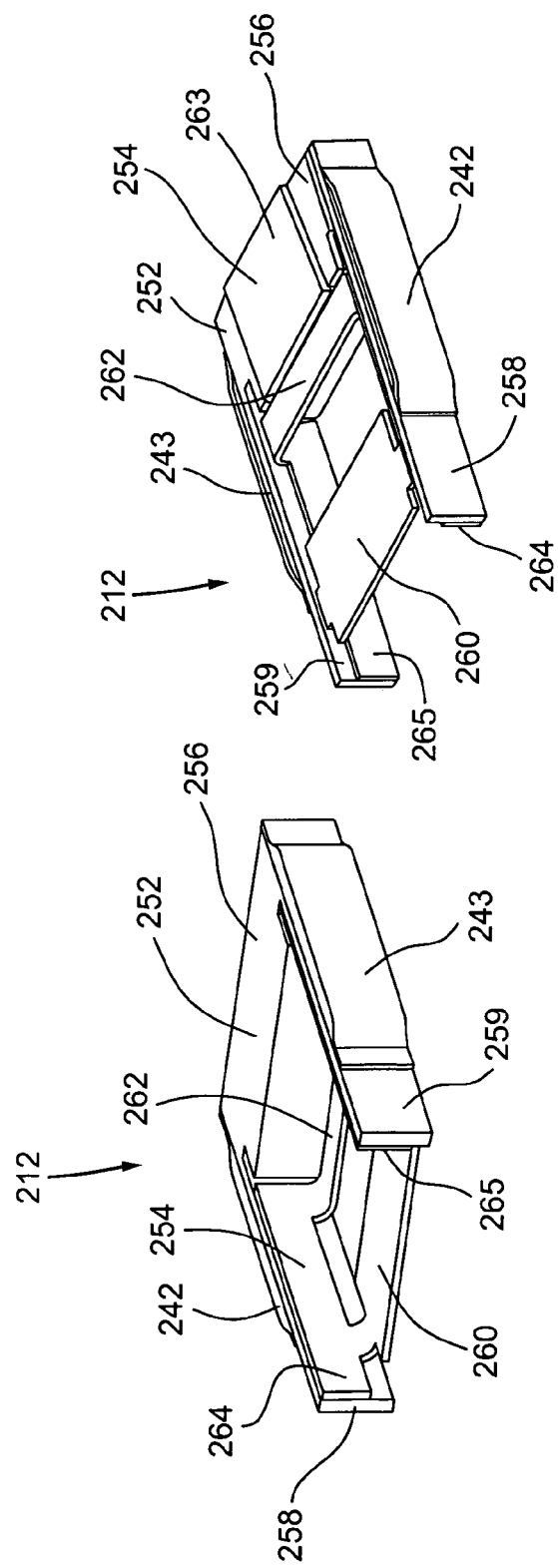
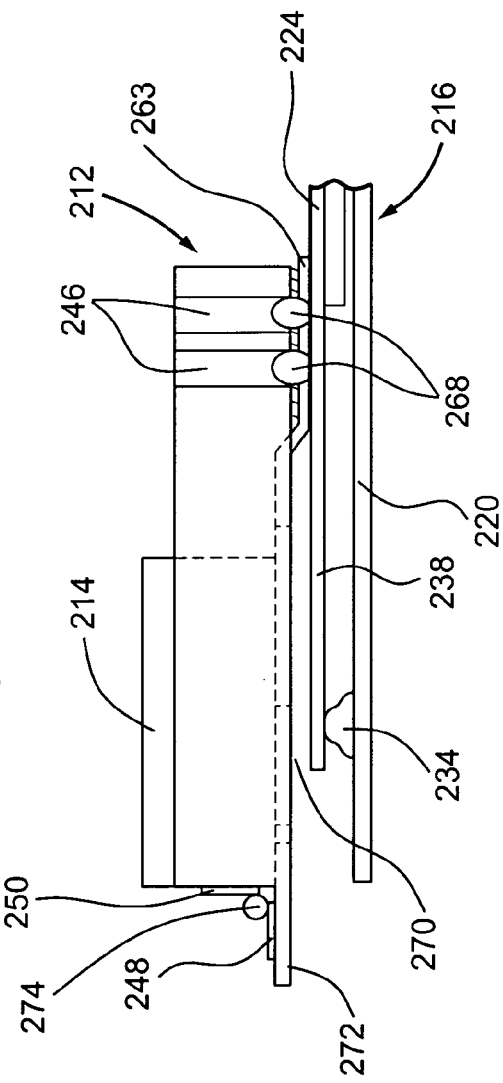

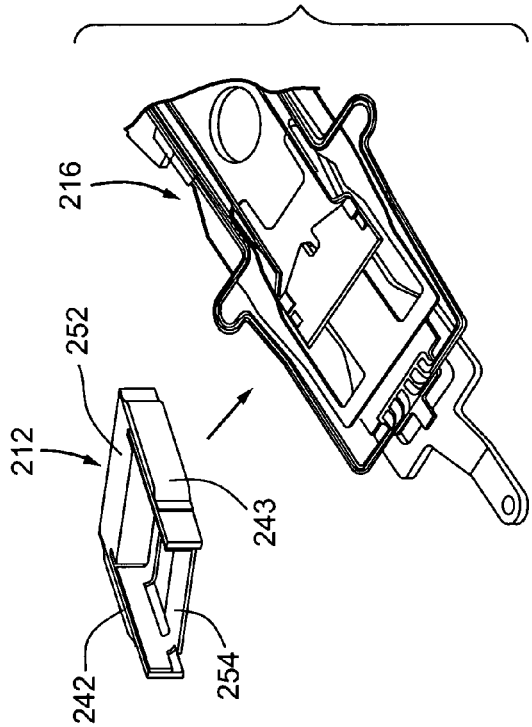
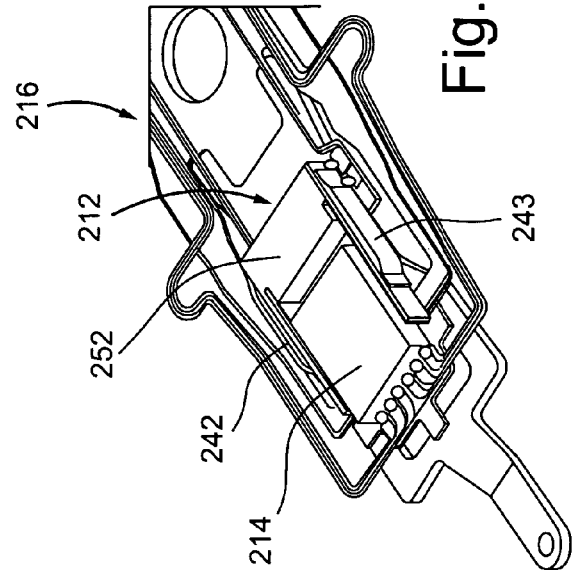
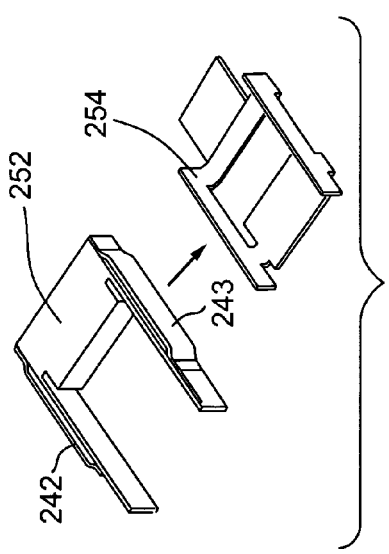
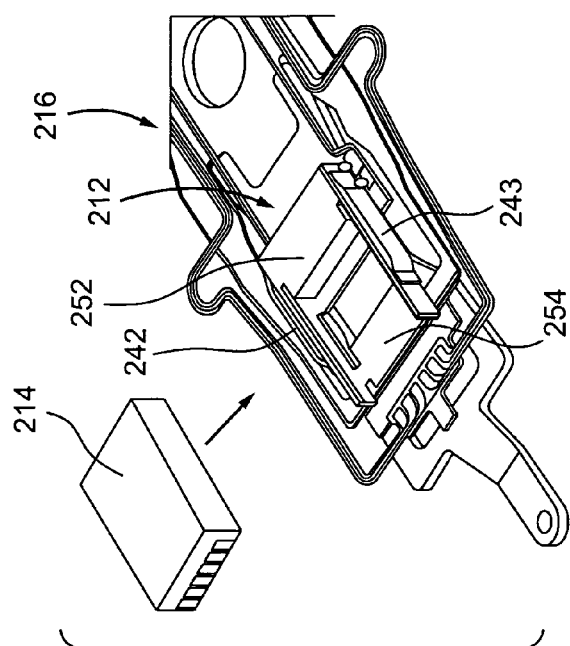

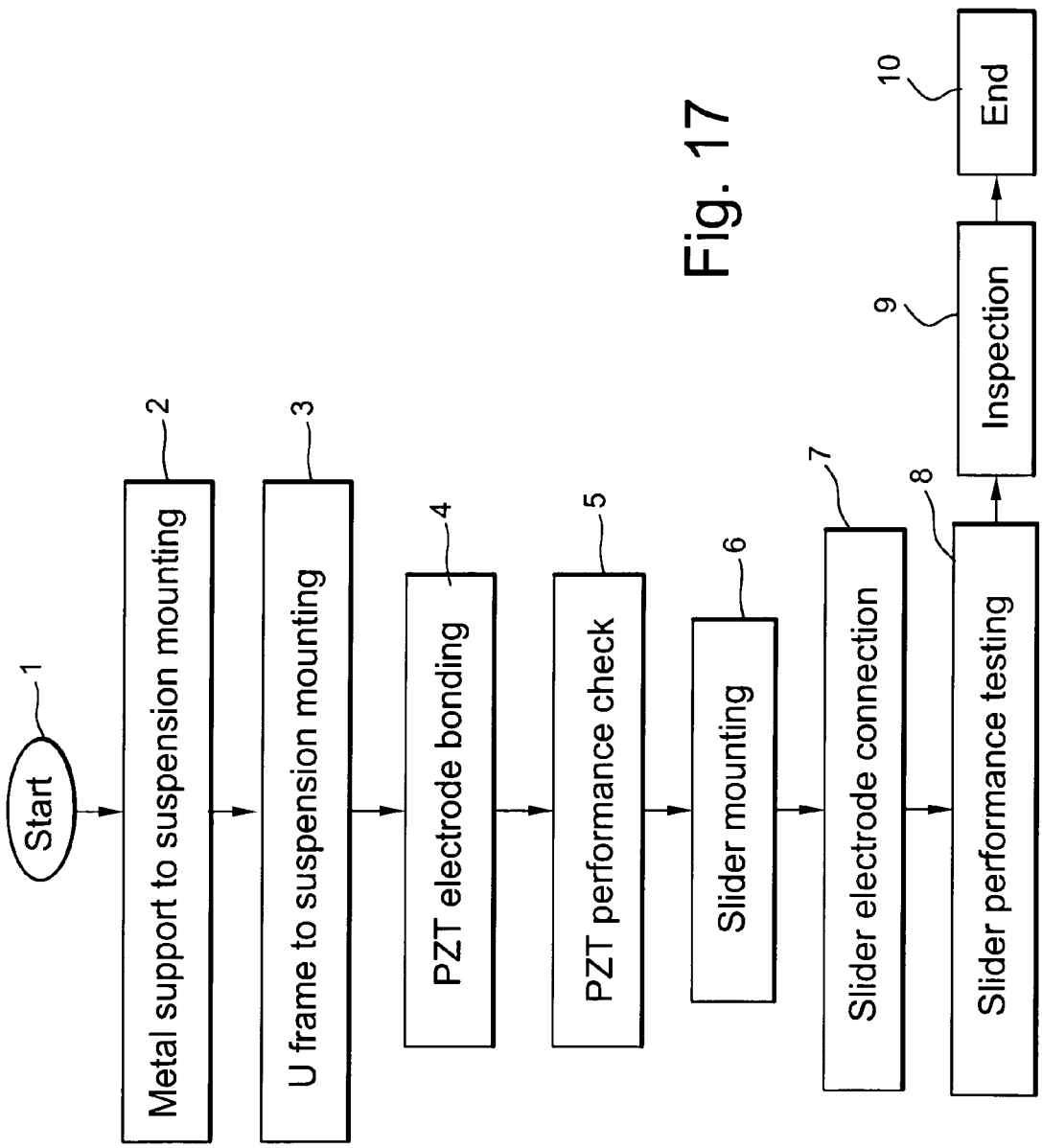

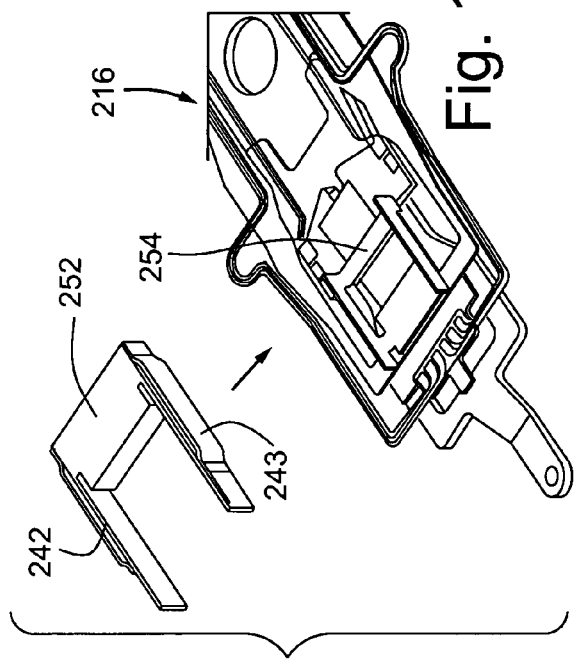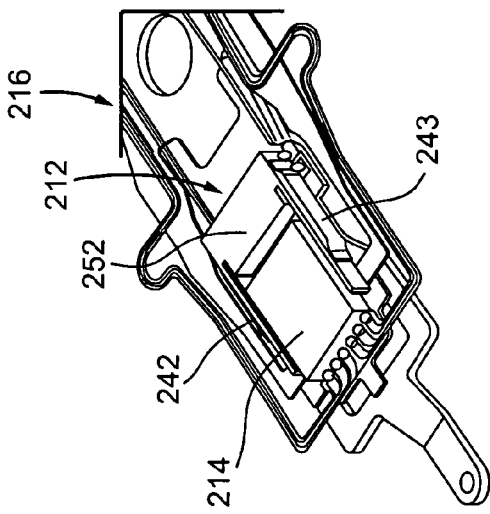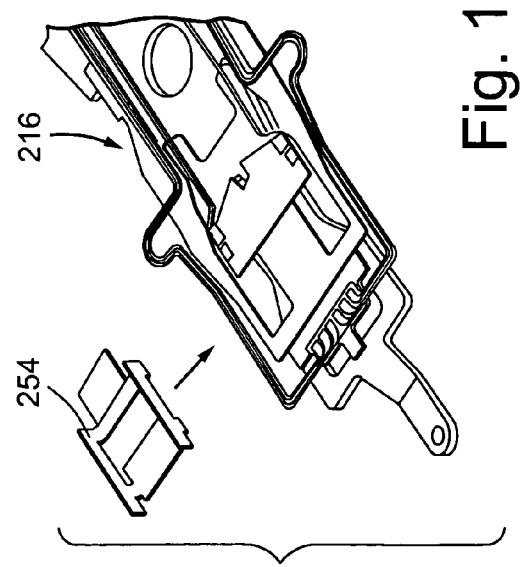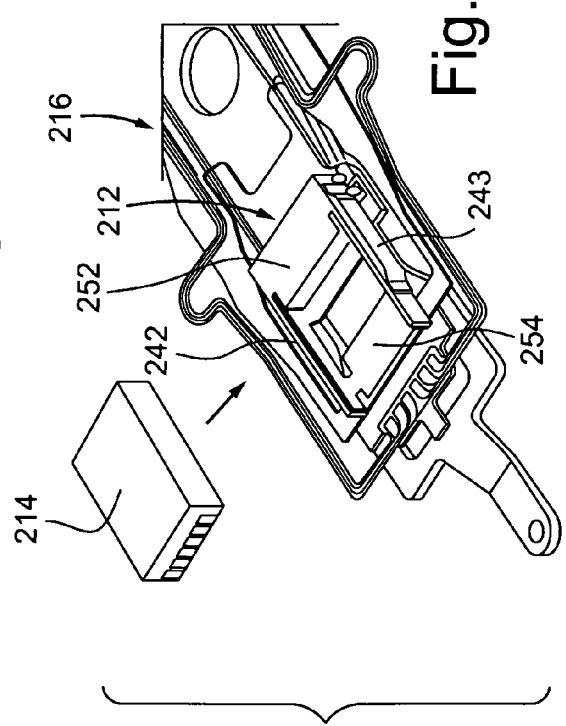

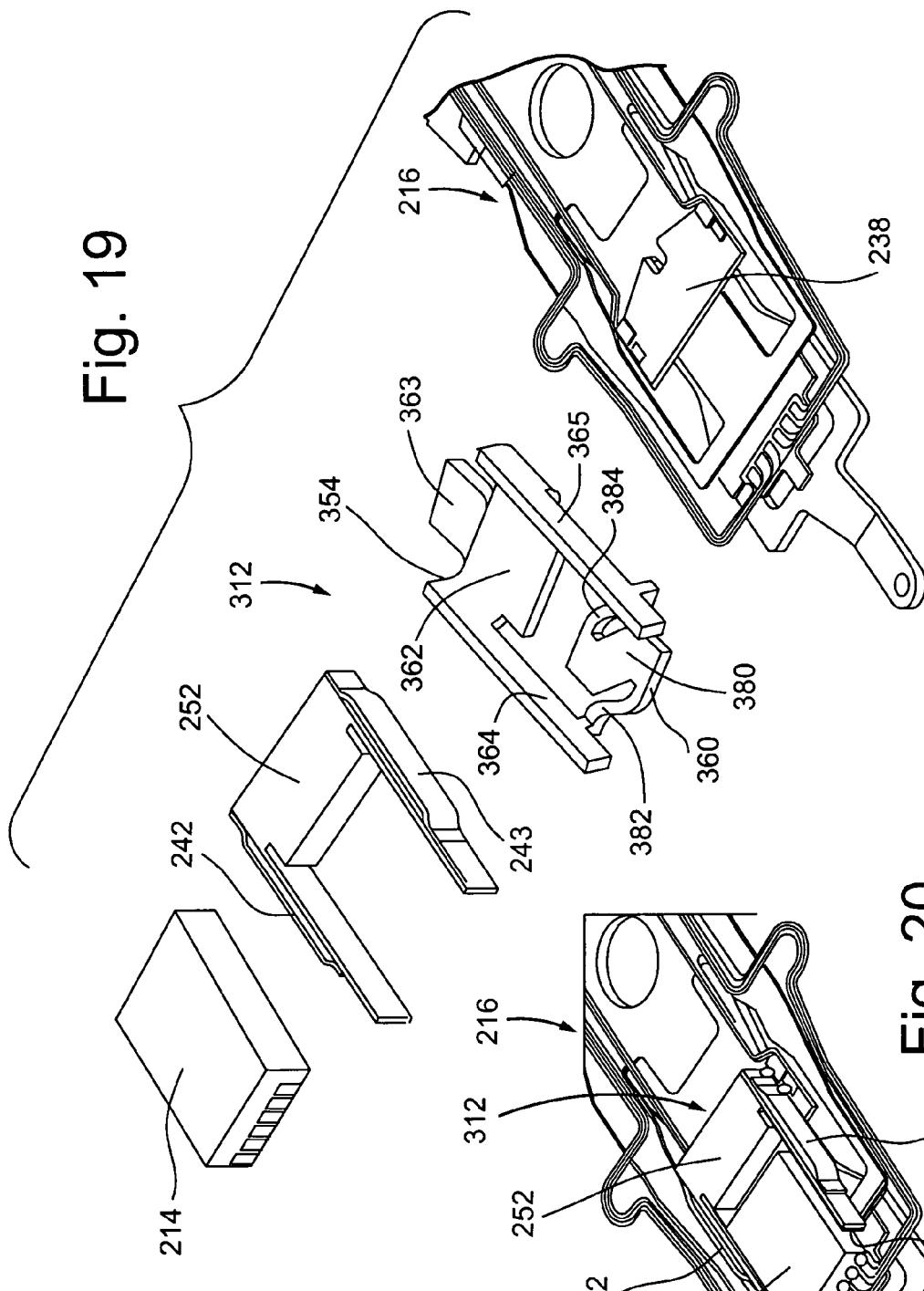

MICRO-ACTUATOR INCLUDING U-SHAPED FRAME AND METAL SUPPORT FRAME, AND MANUFACTURING METHOD THEREOF

FIELD OF THE INVENTION

The present invention relates to information recording disk drive devices and, more particularly, to a micro-actuator for a head gimbal assembly (HGA) of the disk drive device.

BACKGROUND OF THE INVENTION

One known type of information storage device is a disk drive device that uses magnetic media to store data and a movable read/write head that is positioned over the media to selectively read from or write to the disk.

Consumers are constantly desiring greater storage capacity for such disk drive devices, as well as faster and more accurate reading and writing operations. Thus, disk drive manufacturers have continued to develop higher capacity disk drives by, for example, increasing the density of the information tracks on the disks by using a narrower track width and/or a narrower track pitch. However, each increase in track density requires that the disk drive device have a corresponding increase in the positional control of the read/write head in order to enable quick and accurate reading and writing operations using the higher density disks. As track density increases, it becomes more and more difficult using known technology to quickly and accurately position the read/write head over the desired information tracks on the storage media. Thus, disk drive manufacturers are constantly seeking ways to improve the positional control of the read/write head in order to take advantage of the continual increases in track density.

One approach that has been effectively used by disk drive manufacturers to improve the positional control of read/write heads for higher density disks is to employ a secondary actuator, known as a micro-actuator, that works in conjunction with a primary actuator to enable quick and accurate positional control for the read/write head. Disk drives that incorporate a micro-actuator are known as dual-stage actuator systems.

Various dual-stage actuator systems have been developed in the past for the purpose of increasing the access speed and fine tuning the position of the read/write head over the desired tracks on high density storage media. Such dual-stage actuator systems typically include a primary voice-coil motor (VCM) actuator and a secondary micro-actuator, such as a PZT element micro-actuator. The VCM actuator is controlled by a servo control system that rotates the actuator arm that supports the read/write head to position the read/write head over the desired information track on the storage media. The PZT element micro-actuator is used in conjunction with the VCM actuator for the purpose of increasing the positioning access speed and fine tuning the exact position of the read/write head over the desired track. Thus, the VCM actuator makes larger adjustments to the position of the read/write head, while the PZT element micro-actuator makes smaller adjustments that fine tune the position of the read/write head relative to the storage media. In conjunction, the VCM actuator and the PZT element micro-actuator enable information to be efficiently and accurately written to and read from high density storage media.

One known type of micro-actuator incorporates PZT elements for causing fine positional adjustments of the read/write head. Such PZT micro-actuators include associated electronics that are operable to excite the PZT elements on the micro-actuator to selectively cause expansion or contraction thereof. The PZT micro-actuator is configured such that expansion or contraction of the PZT elements causes movement of the micro-actuator which, in turn, causes movement of the read/write head. This movement is used to make faster and finer adjustments to the position of the read/write head, as compared to a disk drive unit that uses only a VCM actuator. Exemplary PZT micro-actuators are disclosed in, for example, JP 2002-133803, entitled "Micro-actuator and HGA" and JP 2002-074871,entitled "Head Gimbal Assembly Equipped with Actuator for Fine Position, Disk Drive Equipped with Head Gimbals Assembly, and Manufacture Method for Head Gimbal Assembly." Other exemplary PZT micro-actuators are also disclosed in, for example, U.S. Pat. Nos. 6,671,131 and 6,700,749.

FIGS. 1 and 2 illustrate a conventional disk drive unit and show a magnetic disk 101 mounted on a spindle motor 102 for spinning the disk 101. A voice coil motor arm 104 carries a head gimbal assembly (HGA) 100 that includes a micro-actuator 105 with a slider 103 incorporating a read/write head. A voice-coil motor (VCM) is provided for controlling the motion of the motor arm 104 and, in turn, controlling the slider 103 to move from track to track across the surface of the disk 101, thereby enabling the read/write head to read data from or write data to the disk 101. In operation, a lift force is generated by the aerodynamic interaction between the slider 103, incorporating the read/write transducer, and the spinning magnetic disk 101. The lift force is opposed by equal and opposite spring forces applied by a suspension of the HGA 100 such that a predetermined flying height above the surface of the spinning disk 101 is maintained over a full radial stroke of the motor arm 104.

FIG. 3 illustrates the head gimbal assembly (HGA) 100 of the conventional disk drive device of FIGS. 1-2 incorporating a dual-stage actuator. However, because of the inherent tolerances of the VCM and the head suspension assembly, the slider 103 cannot achieve quick and fine position control which adversely impacts the ability of the read/write head to accurately read data from and write data to the disk. As a result, a PZT micro-actuator 105, as described above, is provided in order to improve the positional control of the slider and the read/write head. More particularly, the PZT micro-actuator 105 corrects the displacement of the slider 103 on a much smaller scale, as compared to the VCM, in order to compensate for the resonance tolerance of the VCM and/or head suspension assembly. The micro-actuator 105 enables, for example, the use of a smaller recording track pitch, and can increase the "tracks-per-inch" (TPI) value by 50% for the disk drive unit, as well as provide an advantageous reduction in the head seeking and settling time. Thus, the PZT micro-actuator 105 enables the disk drive device to have a significant increase in the surface recording density of the information storage disks used therein.

Referring more particularly to FIGS. 3 and 4, a conventional PZT micro-actuator 105 includes a ceramic U-shaped frame which has two ceramic beams or side arms 107 each having a PZT element thereon. The ceramic beams 107 hold the slider 103 therebetween and displace the slider 103 by movement of the ceramic beams 107. The PZT micro-actuator 105 is physically coupled to a suspension tongue 114 of suspension 113. Three electrical connection balls 109 (gold ball bonding or solder ball bonding, GBB or SBB) are provided to couple the micro-actuator 105 to the suspension traces 110 located at the side of each of the ceramic beams 107. In addition, there are four metal balls 108 (GBB or SBB) for coupling the slider 103 to the traces 110.

FIG. 5 generally shows an exemplary process for assembling the slider 103 with the micro-actuator 105. As illustrated, the slider 103 is partially bonded with the two ceramic beams 107 at two predetermined positions 106 by epoxy 112. This bonding makes the movement of the slider 103 dependent on the movement of the ceramic beams 107 of the micro-actuator 105. A PZT element 116 is attached on each of the ceramic beams 107 of the micro-actuator to enable controlled movement of the slider 103 through excitation of the PZT elements 116. More particularly, when power is supplied through the suspension traces 110, the PZT elements 116 expand or contract to cause the two ceramic beams 107 of the U-shape micro-actuator frame to bend in a common lateral direction, thereby making the slider 103 undergo a lateral translation and move on the track of the disk in order to fine tune the position of the read/write head. In this manner, controlled displacement of slider 103 can be achieved for fine positional tuning.

Referring to FIG. 6, the load beam 160 of the suspension 113 has a dimple 162 formed thereon that engages the suspension tongue 114. A parallel gap 170 is provided between the suspension tongue 114 and the micro-actuator 105 to allow the micro-actuator 105 to smoothly displace the slider 103 when a voltage is input to the PZT elements of the micro-actuator 105. The gap 170 is important for micro-actuator operation and HGA performance.

FIGS. 7 and 8 illustrate a tilt problem with this prior design arrangement. Due to manufacturing issues, the micro-actuator 105 may creep or tilt when the slider is flying on the disk. For example, FIG. 7 illustrates the gap 170 being reduced when the micro-actuator 105 tilts towards the suspension tongue 114, and FIG. 8 illustrates the gap 170 being increased when the micro-actuator 105 tilts away from the suspension tongue 114. A general case scenario is that the head static angle may change, and a worst case scenario is that the micro-actuator tilt may cause engagement between the micro-actuator 105 and the suspension tongue 114. Both of these scenarios will affect micro-actuator performance and may cause slider read/write errors, cause static problems, affect head flying performance, cause damage to the head/disk system, and/or cause the micro-actuator to not work.

Since the above-described design includes a U-shaped ceramic frame, the brittleness or fragileness of the ceramic material effects the shock performance, e.g., not strong enough shock performance. Also, the previous design has difficulty controlling the parallel gap between the micro-actuator and the suspension tongue during manufacture. In addition, the previous design is difficult for small size slider application, and the previous design has difficulty in the slider mounting process because the slider is mounted on inner side surfaces of the two micro-actuator arms.

Thus, there is a need for an improved micro-actuator for use in head gimbal assemblies and disk drive units that does not suffer from the above-mentioned drawbacks.

SUMMARY OF THE INVENTION

One aspect of the present invention relates to a micro-actuator for a head gimbal assembly. The micro-actuator includes a U-shaped frame and a metal support frame. The U-shaped frame includes a bottom support, a pair of side arms extending from the bottom support, and a PZT element mounted to each of the side arms. Each PZT element is excitable to cause selective movement of the side arms. The metal support frame includes a top support adapted to support a slider of the head gimbal assembly, a bottom support adapted to be connected to a suspension of the head gimbal assembly, and a pair of side arms that interconnect the bottom support and the top support. The metal support frame is mounted to the U-shaped frame such that the side arms of the metal support frame are mounted to respective side arms of the U-shaped frame and the bottom support of the metal support frame is mounted to the bottom support of the U-shaped frame.

Another aspect of the present invention relates to a head gimbal assembly including a micro-actuator, a slider, and a suspension that supports the micro-actuator and the slider. The micro-actuator includes a U-shaped frame and a metal support frame. The U-shaped frame includes a bottom support, a pair of side arms extending from the bottom support, and a PZT element mounted to each of the side arms. Each PZT element is excitable to cause selective movement of the side arms. The metal support frame includes a top support that supports the slider, a bottom support connected to the suspension, and a pair of side arms that interconnect the bottom support and the top support. The metal support frame is mounted to the U-shaped frame such that the side arms of the metal support frame are mounted to respective side arms of the U-shaped frame and the bottom support of the metal support frame is mounted to the bottom support of the U-shaped frame.

Another aspect of the present invention relates to a disk drive device including a head gimbal assembly, a drive arm connected to the head gimbal assembly, a disk, and a spindle motor operable to spin the disk. The head gimbal assembly includes a micro-actuator, a slider, and a suspension that supports the micro-actuator and slider. The micro-actuator includes a U-shaped frame and a metal support frame. The U-shaped frame includes a bottom support, a pair of side arms extending from the bottom support, and a PZT element mounted to each of the side arms. Each PZT element is excitable to cause selective movement of the side arms. The metal support frame includes a top support that supports the slider, a bottom support connected to the suspension, and a pair of side arms that interconnect the bottom support and the top support. The metal support frame is mounted to the U-shaped frame such that the side arms of the metal support frame are mounted to respective side arms of the U-shaped frame and the bottom support of the metal support frame is mounted to the bottom support of the U-shaped frame.

Another aspect of the present invention relates to a method for manufacturing a head gimbal assembly. The method includes mounting a first frame structure including PZT elements to a second frame structure to provide a micro-actuator, mounting the micro-actuator to a suspension, electrically connecting the PZT elements to the suspension, performing a PZT performance check on the PZT elements, mounting a slider to the micro-actuator, electrically connecting the slider to the suspension, performing a slider performance test on the slider, and performing a final inspection.

Yet another aspect of the present invention relates to a method for manufacturing a head gimbal assembly. The method includes mounting a first frame structure to a suspension, mounting a second frame structure including PZT elements to the first frame structure on the suspension to provide a micro-actuator, electrically connecting the PZT elements to the suspension, performing a PZT performance check on the PZT elements, mounting a slider to the micro-actuator, electrically connecting the slider to the suspension, performing a slider performance test on the slider, and performing a final inspection.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 9 is a perspective view of a head gimbal assembly (HGA) including a PZT micro-actuator according to an embodiment of the present invention;

FIG. 10 is a partial perspective of the HGA shown in FIG. 9;

FIG. 11 is a partial side view of the HGA shown in FIG. 9;

FIG. 13 is a top perspective view of the PZT micro-actuator shown in FIG. 9 removed from the HGA;

FIG. 14 is a bottom perspective view of the PZT micro-actuator shown in FIG. 13;

FIGS. 16a-16d are sequential perspective views illustrating the manufacturing and assembly process shown in FIG. 15;

FIG. 17 is a flow chart illustrating a manufacturing and assembly process according to another embodiment of the present invention;

FIGS. 18a-18d are sequential perspective views illustrating the manufacturing and assembly process shown in FIG. 17;

FIG. 19 is an exploded view of a HGA including a PZT micro-actuator according to another embodiment of the present invention; and FIG. 20 is a perspective view of the HGA shown in FIG. 19 in an assembled condition.

DETAILED DESCRIPTION OF ILLUSTRATED EMBODIMENTS

Figure 1:
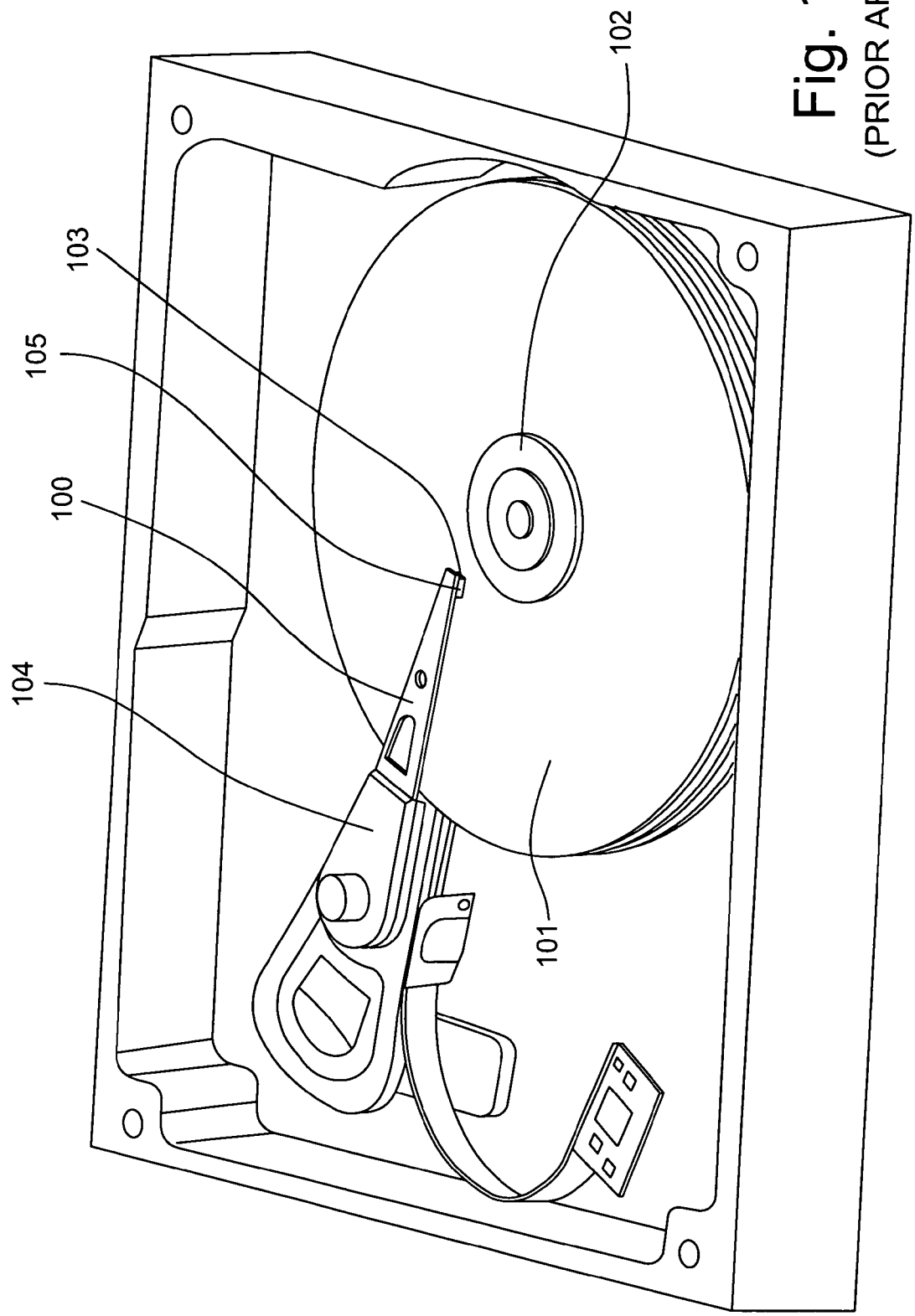
FIG. 1 is a perspective view of a conventional disk drive unit.
Figure 2:
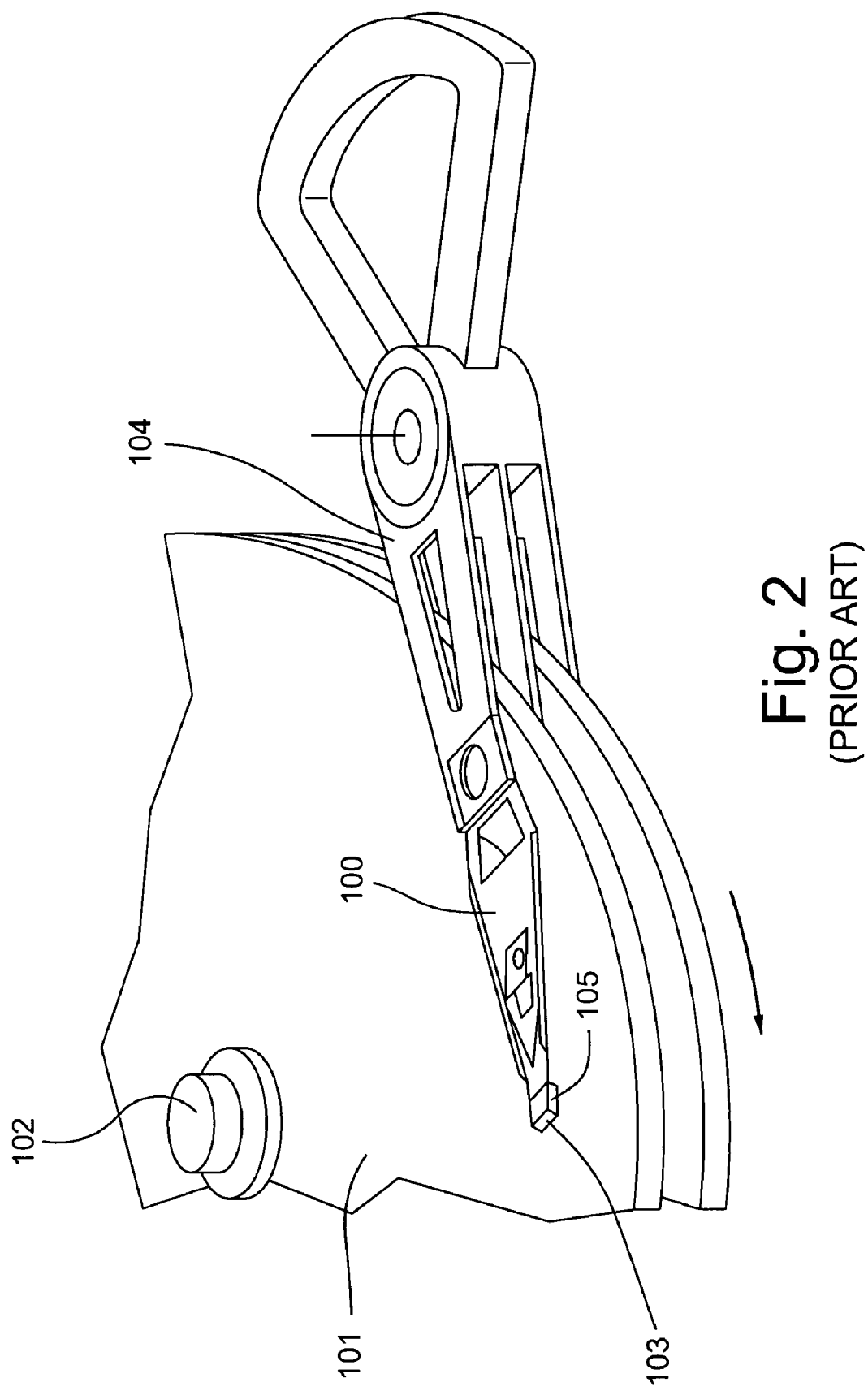
FIG. 2 is a partial perspective view of the conventional disk drive unit shown in FIG. 1.
Figure 3:
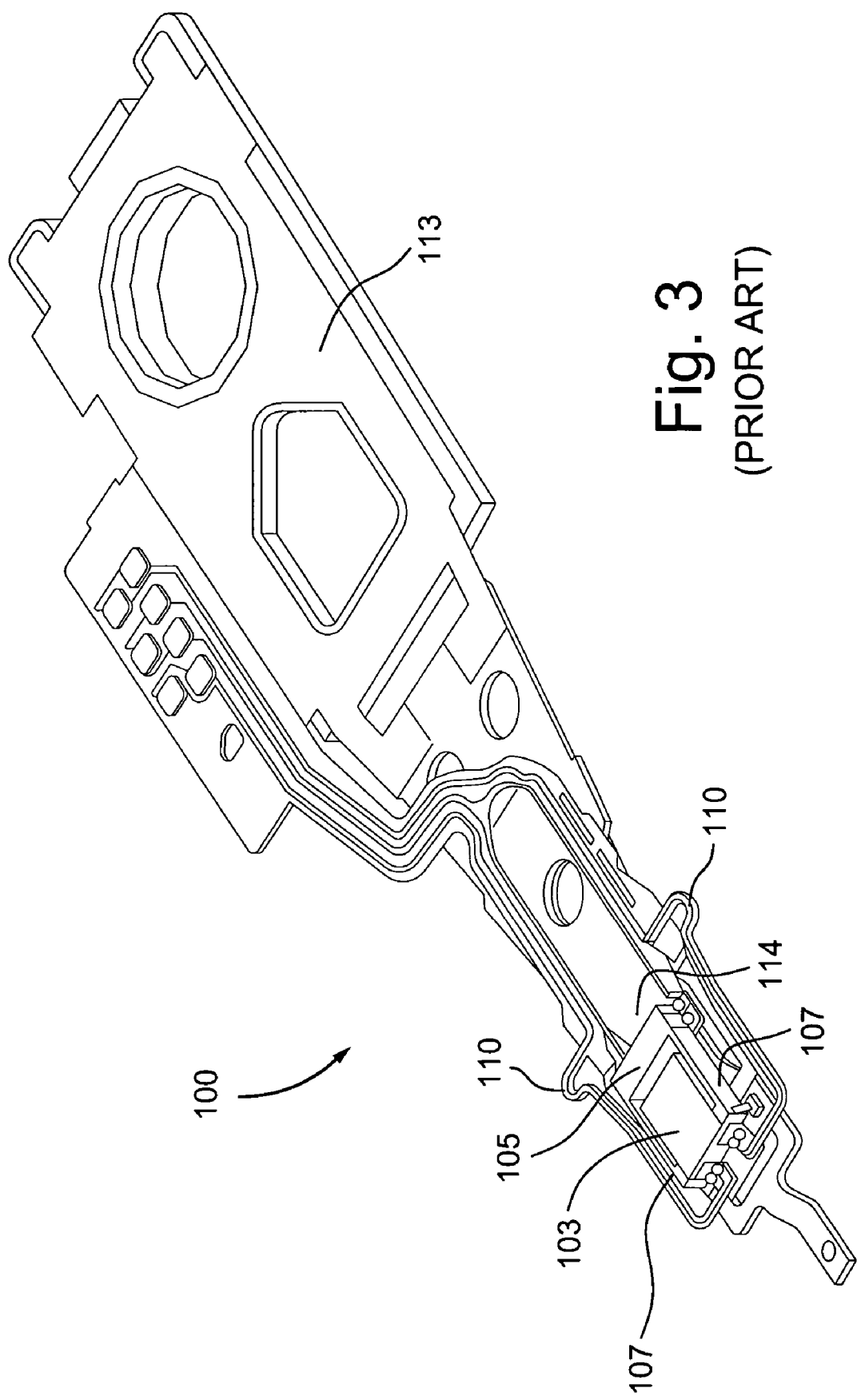
FIG. 3 is a perspective view of a conventional head gimbal assembly (HGA)
Figure 4:
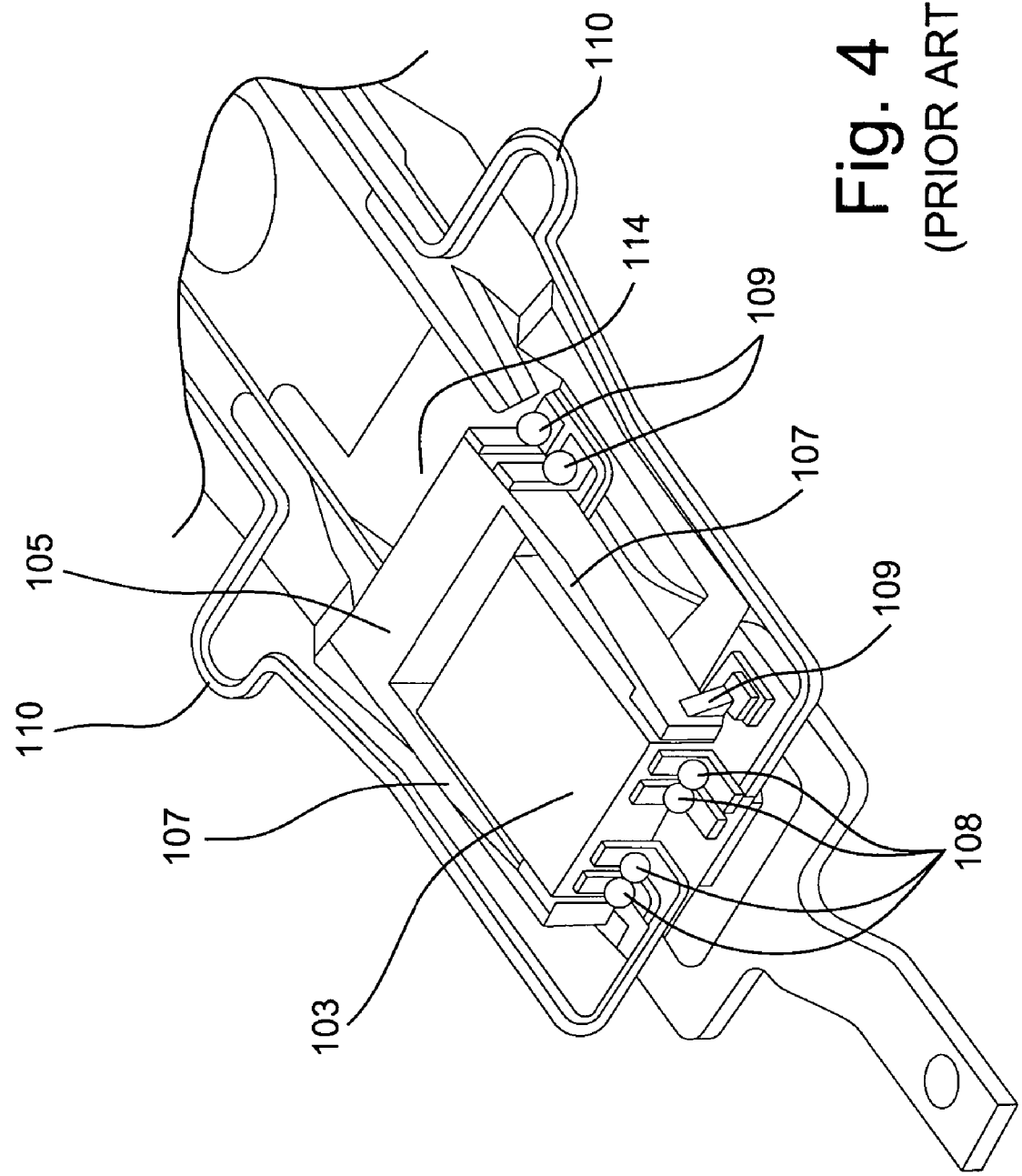
FIG. 4 is an enlarged, partial perspective view of the HGA shown in FIG. 3.
Figure 5:
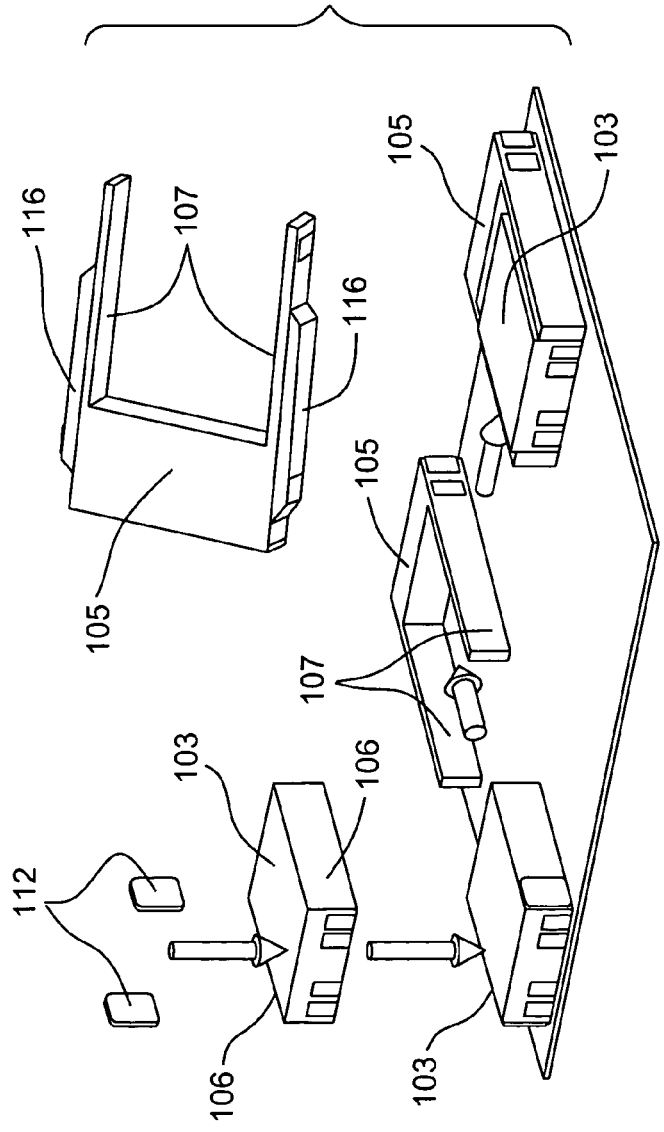
FIG. 5 illustrates a general process of inserting a slider into the micro-actuator of the HGA shown in FIGS. 3 and 4.
Figure 6:
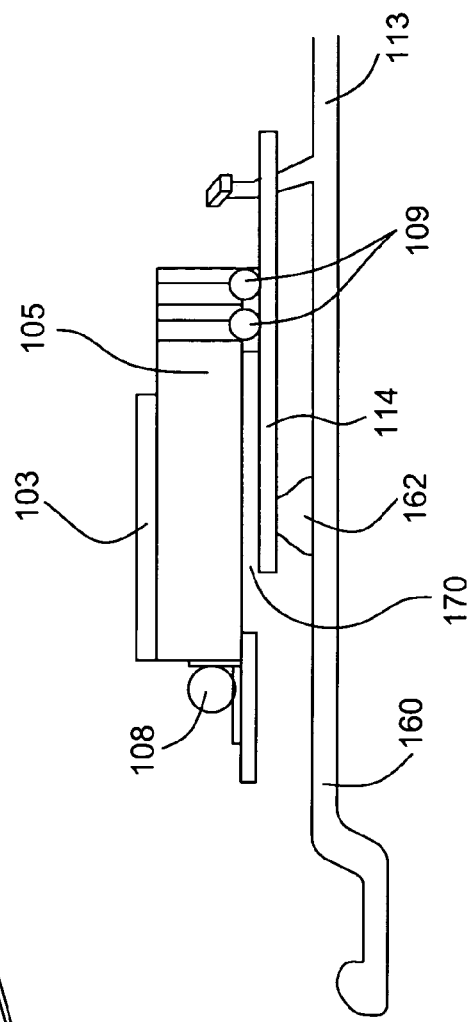
FIG. 6 is a side view of the HGA shown in FIG. 3.
Figure 8:
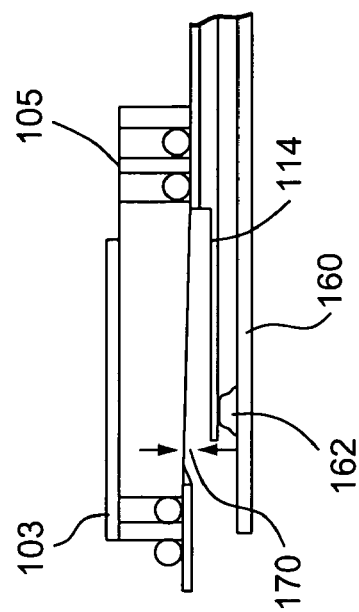
FIG. 8 is a side view of the HGA shown in FIG. 3 illustrating micro-actuator tilt which increases the gap between the micro-actuator and suspension.
Figure 7:
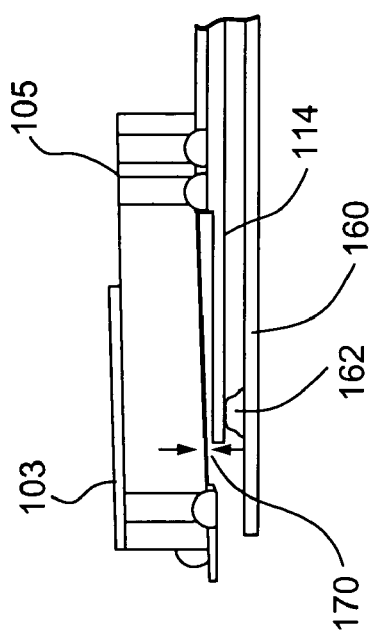
FIG. 7 is a side view of the HGA shown in FIG. 3 illustrating micro-actuator tilt which reduces the gap between the micro-actuator and suspension.

Various embodiments of the present invention will now be described with reference to the figures, wherein like reference numerals designate similar parts throughout the various views. An aspect of the present invention is to provide a micro-actuator that is structured to maintain a parallel gap between the micro-actuator and the HGA suspension while precisely actuating the slider using the micro-actuator. By maintaining the parallel gap between the micro-actuator and the HGA suspension, the performance characteristics of the disk drive device are improved.

Several example embodiments of a micro-actuator for a HGA will now be described. It is noted that the micro-actuator may be implemented in any suitable disk drive device having a micro-actuator, regardless of the specific structure of the HGA as illustrated in the figures. That is, the invention may be used in any suitable device having a micro-actuator in any industry.

FIGS. 9-14 illustrate a head gimbal assembly (HGA) 210 incorporating a PZT micro-actuator 212 according to a first exemplary embodiment of the present invention. The HGA 210 includes a PZT micro-actuator 212, a slider 214, and a suspension 216 to support the PZT micro-actuator 212 and the slider 214.

As best shown in FIGS. 9-12, the suspension 216 includes a base plate 218, a load beam 220, a hinge 222, a flexure 224, and inner and outer suspension traces 226, 227 in the flexure 224. The base plate 218 includes a mounting hole 228 for use in connecting the suspension 216 to a drive arm of a voice coil motor (VCM) of a disk drive device. The shape of the base plate 218 may vary depending on the configuration or model of the disk drive device. Also, the base plate 218 is constructed of a relatively hard or rigid material, e.g., metal, to stably support the suspension 216 on the drive arm of the VCM.

The hinge 222 is mounted onto the base plate 218 and load beam 220, e.g., by welding. As illustrated, the hinge 222 includes a hole 230 that aligns with the hole 228 provided in the base plate 218. Also, the hinge 222 includes a holder bar 232 for supporting the load beam 220.

The load beam 220 is mounted onto the holder bar 232 of the hinge 222, e.g., by welding. The load beam 220 has a dimple 234 formed thereon for engaging the flexure 224 (see FIG. 11). An optional lift tab 236 may be provided on the load beam 220 to lift the HGA 210 from the disk, e.g., when the disk is not rotated.

The flexure 224 is mounted to the hinge 222 and the load beam 220, e.g., by lamination or welding. The flexure 224 provides a suspension tongue 238 to couple the PZT micro-actuator 212 to the suspension 216 (see FIG. 12). The suspension tongue 238 engages the dimple 234 on the load beam 220. Also, the suspension traces 226, 227 are provided on the flexure 224 to electrically connect a plurality of connection pads 240 (which connect to an external control system) with the slider 214 and the PZT elements 242, 243 on the PZT micro-actuator 212. The suspension traces 226, 227 may be a flexible printed circuit (FPC) and may include any suitable number of lines.

Figure 12:
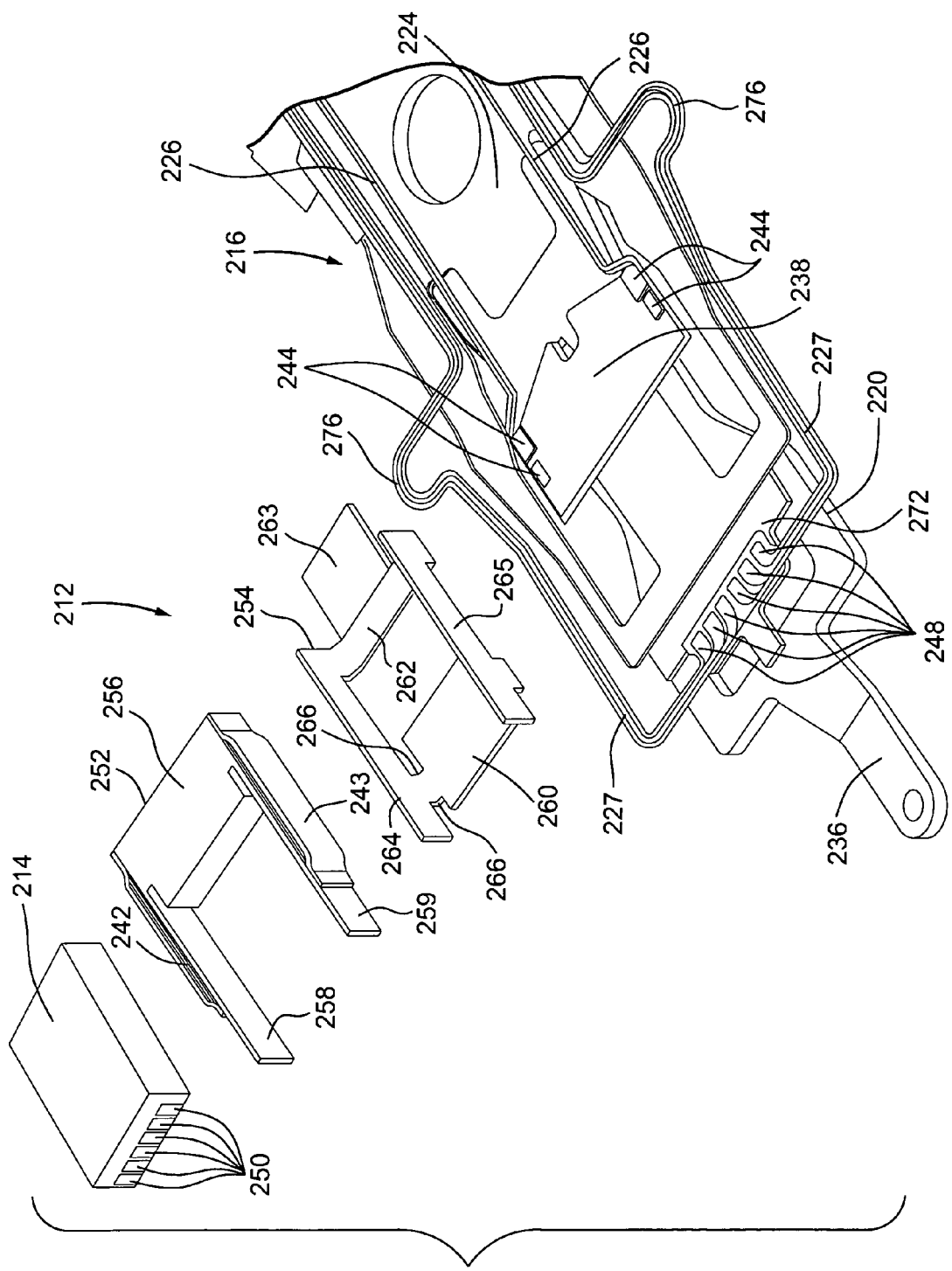
FIG. 12 is an exploded view of the HGA shown in FIG. 9.
Figure 15:
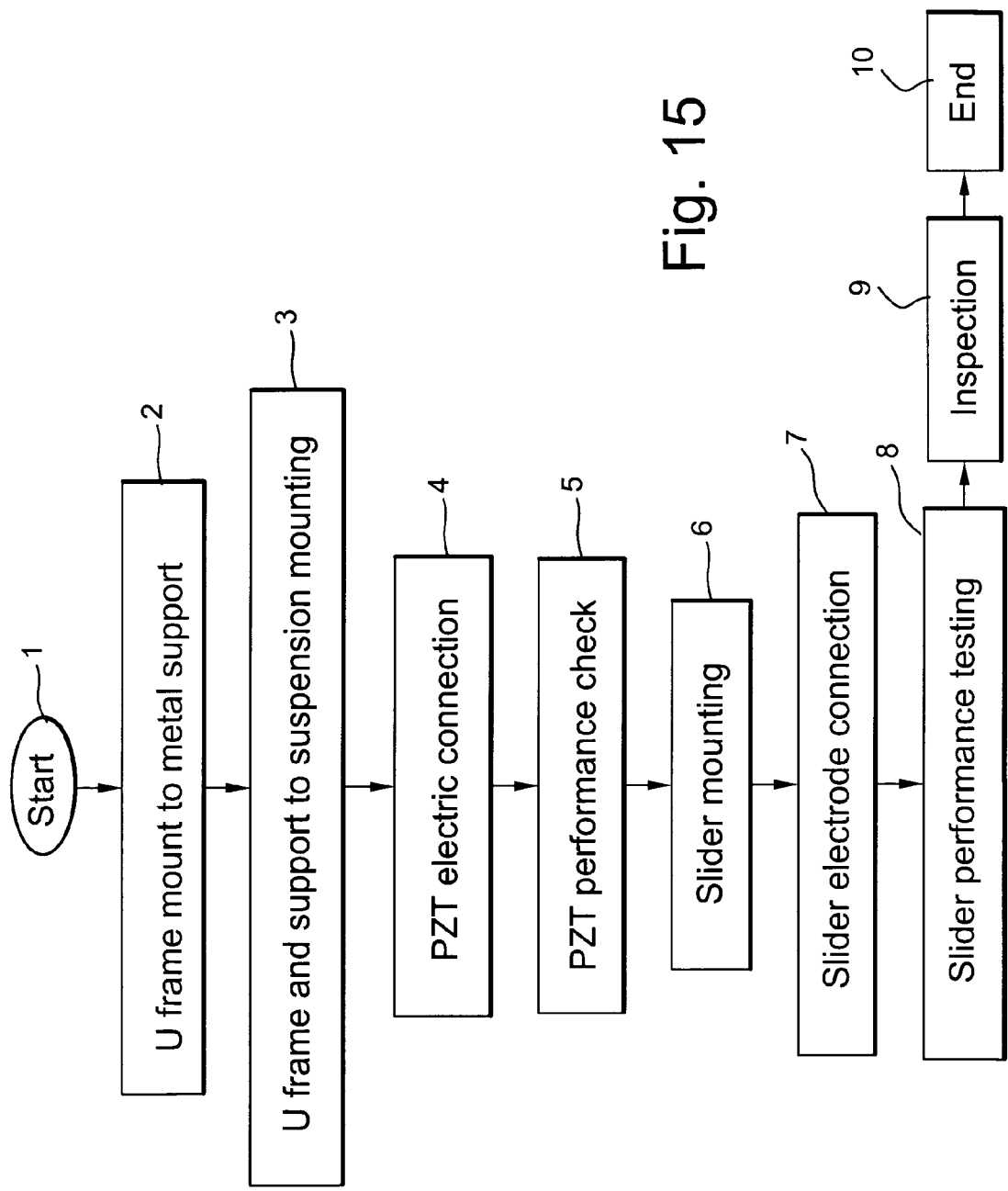
FIG. 15 is a flow chart illustrating a manufacturing and assembly process according to an embodiment of the present invention.

As best shown in FIGS. 10, 11, and 12, bonding pads 244 are directly connected to the inner suspension traces 226 to electrically connect the inner suspension traces 226 with bonding pads 246 provided on the PZT elements 242, 243. Also, bonding pads 248 are directly connected to the outer suspension traces 227 to electrically connect the outer suspension traces 227 with bonding pads 250 provided on the slider 214.

A voice-coil motor (VCM) is provided in the disk drive device for controllably driving the drive arm and, in turn, the HGA 210 in order to enable the HGA 210 to position the slider 214, and associated read/write head, over any desired information track on a disk in the disk drive device. The PZT micro-actuator 212 is provided to enable faster and finer positional control for the device, as well as to reduce the head seeking and settling time during operation. Thus, when the HGA 210 is incorporated into a disk drive device, a dual-stage actuator system is provided in which the VCM actuator provides large positional adjustments and the PZT micro-actuator 212 provides fine positional adjustments for the read/write head.

FIGS. 12-14 illustrate the PZT micro-actuator 212 removed from the slider 214 and the suspension 216. As illustrated, the PZT micro-actuator 212 includes two parts.

Specifically, the PZT micro-actuator 212 includes a U-shaped frame 252 with PZT elements 242, 243 and a metal support frame 254 to support the U-shaped frame 252.

The U-shaped frame 252 includes a bottom support 256 and side arms 258, 259 that extend from the bottom support 256. The U-shaped frame 252 may be constructed of metal, ceramic, or other suitable material.

A PZT element 242, 243 is mounted to an outwardly facing surface of a respective side arm 258, 259 of the U-shaped frame 252. Bonding pads 246, e.g., two pads, are provided on the PZT elements 242, 243 for electrically connecting the PZT elements 242, 243 to the inner suspension traces 226. Each PZT element 242, 243 may be a ceramic PZT, thin-film PZT, or PMN-Pt, and may be single-layer or multi-layer.

The metal support frame 254 includes a top support 260, a bottom support 262 with an extended step structure 263, and side arms 264, 265 that interconnect the top support 260 and the bottom support 262.

As illustrated, notches or spaces 266 exist between the top support 260 and respective side arms 264, 265 and/or between the bottom support 262 and respective side arms 264, 265. This arrangement provides the side arms 264, 265 with a longer active length and will allow the side arms 264, 265 more freedom of movement.

As best shown in FIGS. 13 and 14, the metal support frame 254 is assembled to the U-shaped frame 252 such that the side arms 264, 265 are mounted, e.g., by epoxy, to an inner surface of a respective side arm 258, 259. Also, the extended step structure 263 of the metal support frame 254 is mounted, e.g., by epoxy, to a bottom surface of the bottom support 256 of the U-shaped frame 252. In an embodiment, the metal support frame 254 is mounted to the U-shaped frame 252 by an epoxy, e.g., when the U-shaped frame 252 is constructed of ceramic and mounted to the metal material of the metal support frame 254. However, the mounting process may also be laser welding when both the U-shaped frame 252 and the metal support frame 254 are constructed of a metal material.

As best shown in FIGS. 10 and 11, the bottom support 262 of the metal support frame 254 is structured to connect the PZT micro-actuator 212 to the suspension 216. Specifically, the extended step structure 263 of the bottom support 262 is partially mounted to the suspension tongue 238 of the flexure 224, e.g., by epoxy, resin, or welding. Also, the PZT bonding pads 246, e.g., two bonding pads, provided on respective PZT elements 242, 243 are electrically connected to respective bonding pads 244 on the inner suspension traces 226 using electrical connection balls (GBB or SBB) 268. This allows power to be applied via the inner suspension traces 226 to the PZT elements 242, 243.

Since the extended step structure 263 is mounted to a bottom surface of the bottom support 256 of the U-shaped frame 252, the extended step structure 263 will be sandwiched between the suspension tongue 238 and the U-shaped frame 252 when the PZT micro-actuator 212 is mounted to the suspension tongue 238. This arrangement helps to maintain the parallel gap 270 (see FIG. 11) between the suspension tongue 238 and the PZT micro-actuator 212 in use, and helps to prevent micro-actuator tilt between the suspension tongue 238 and the PZT micro-actuator 212 in use.

The top support 260 of the metal support frame 254 is structured to connect the PZT micro-actuator 212 to the slider 214. Specifically, the slider 214 is directly mounted on the top support 260. Moreover, multiple bonding pads 250, e.g., six bonding pads, provided on the slider 214 are electrically bonded with respective pads 248 provided on a float plate 272 using, for example, electric connection balls (GBB or SBB) 274. This connects the PZT micro-actuator 212 to the slider 214 and electrically connects the slider 214 and its read/write elements to the outer suspension traces 227 on the suspension 216.

Since the slider 214 is directly mounted on the top support 260 (rather than to the side arms), assembly of the HGA is easier. In addition, the structure of the PZT micro-actuator 212 is changeable for smaller size slider applications. Thus, the PZT micro-actuator facilitates manufacture of the HGA and reduces costs.

In the illustrated embodiment, the outer suspension traces 227 each include a curved portion 276. This arrangement helps to release stress due to stiffness of the outer suspension traces 227 when the PZT micro-actuator 212 is operated, which makes the PZT micro-actuator 212 work more smoothly.

FIGS. 15 and 16a-16d illustrate the primary steps involved in the manufacturing and assembly process of the PZT micro-actuator 212 according to an embodiment of the present invention. After the process starts (step 1 in FIG. 15), the U-shaped frame 252 is mounted to the metal support frame 254 (step 2 in FIG. 15), as shown in FIG. 16a. Next, as shown in FIG. 16b, the assembled U-shaped frame 252 and metal support frame 254 is mounted to the suspension 216 (step 3 in FIG. 15). After mounting, the PZT elements 242, 243 are electrically connected to the suspension 216 (step 4 in FIG. 15), and a PZT performance check is performed (step 5 in FIG. 15). Then, as shown in FIG. 16c, the slider 214 is mounted to the metal support frame 254 of the PZT micro-actuator 212 (step 6 in FIG. 15). After the slider 214 is mounted as shown in FIG. 16d, the slider 214 is electrically connected to the suspension 216 (step 7 in FIG. 15), and a slider performance test is performed (step 8 in FIG. 15). Finally, the assembly is inspected (step 9 in FIG. 15) to complete the manufacturing and assembly process (step 10 in FIG. 15).

FIGS. 17 and 18a-18d illustrate the primary steps involved in the manufacturing and assembly process of the PZT micro-actuator 212 according to another embodiment of the present invention. After the process starts (step 1 in FIG. 17), the metal support frame 254 is mounted to the suspension 216 (step 2 in FIG. 17), as shown in FIG. 18a. Next, as shown in FIG. 18b, the U-shaped frame 252 is mounted to the metal support frame 254 on the suspension 216 (step 3 in FIG. 17). After mounting, the PZT elements 242, 243 are electrically connected to the suspension 216 (step 4 in FIG. 17), and a PZT performance check is performed (step 5 in FIG. 17). Then, as shown in FIG. 18c, the slider 214 is mounted to the metal support frame 254 of the PZT micro-actuator 212 (step 6 in FIG. 17). After the slider 214 is mounted as shown in FIG. 18d, the slider 214 is electrically connected to the suspension 216 (step 7 in FIG. 17), and a slider performance test is performed (step 8 in FIG. 17). Finally, the assembly is inspected (step 9 in FIG. 17) to complete the manufacturing and assembly process (step 10 in FIG. 17).

FIGS. 19 and 20 illustrate a PZT micro-actuator 312 according to another exemplary embodiment of the present invention. In this embodiment, the metal support frame 354 of the PZT micro-actuator 312 has a different structure than the metal support frame 254 of the PZT micro-actuator 212. The remaining components of the PZT micro-actuator 312 are substantially similar to the PZT micro-actuator 212 and indicated with similar reference numerals.

As illustrated, the metal support frame 354 includes a top support 360, a bottom support 362 with an extended step structure 363, and side arms 364, 365 that interconnect the top support 360 and the bottom support 362. The top support 360 includes a rotatable plate 380 and curved connection arms or bridges 382, 384 that couple the plate 380 to respective side arms 364, 365. This arrangement allows the rotatable plate 380 to rotate around its center of gravity when the PZT elements 242, 243 are excited in use.

In an embodiment, the metal support frame 354 is mounted to the U-shaped frame 252 by an epoxy, e.g., when the U-shaped frame 252 is constructed of ceramic and mounted to the metal material of the metal support frame 354. However, the mounting process may also be laser welding when both the U-shaped frame 252 and the metal support frame 354 are constructed of a metal material.

Similar to the PZT micro-actuator 212, the extended step structure 363 will be sandwiched between the suspension tongue 238 and the U-shaped frame 252 when the PZT micro-actuator 312 is mounted to the suspension tongue 238. This arrangement helps to maintain the parallel gap between the suspension tongue 238 and the PZT micro-actuator 312 in use, and helps to prevent micro-actuator tilt between the suspension tongue 238 and the PZT micro-actuator 312 in use.

A head gimbal assembly 210 incorporating a PZT micro-actuator 212, 312 according to embodiments of the present invention may be provided to a disk drive device (HDD). The HDD may be of the type described above in connection with FIG. 1. Because the structure, operation and assembly processes of disk drive devices are well known to persons of ordinary skill in the art, further details regarding the disk drive device are not provided herein so as not to obscure the invention. The PZT micro-actuator 212, 312 may be implemented in any suitable disk drive device having a micro-actuator or any other device with a micro-actuator. In an embodiment, the PZT micro-actuator 212, 312 may be used in a high RPM disk drive device.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A micro-actuator for a head gimbal assembly, comprising:
    a U-shaped frame including
        a bottom support,
        a pair of side arms extending from the bottom support, and
        a PZT element mounted to each of the side arms, each PZT element being excitable to cause selective movement of the side arms; and
    a metal support frame including
        a top support adapted to support a slider of the head gimbal assembly,
        a bottom support adapted to be connected to a suspension of the head gimbal assembly, and
        a pair of side arms that interconnect the bottom support and the top support,
    wherein the metal support frame is mounted to the U-shaped frame such that the side arms of the metal support frame are mounted to respective side arms of the U-shaped frame and the bottom support of the metal support frame is mounted to the bottom support of the U-shaped frame.

2. The micro-actuator according to claim 1, wherein the bottom support of the metal support frame includes an extended step structure that is adapted to be connected to the suspension, the extended step structure constructed and arranged to maintain a substantially constant gap between the top support and the suspension in use.

3. The micro-actuator according to claim 2, wherein the extended step structure is sandwiched between the U-shaped frame and the suspension.

4. The micro-actuator according to claim 1, wherein the PZT elements are mounted to outwardly facing surfaces of respective side arms of the U-shaped frame, and the side arms of the metal support frame are mounted to inwardly facing surfaces of respective side arms of the U-shaped frame.

5. The micro-actuator according to claim 1, wherein each PZT element is a ceramic PZT, a thin-film PZT, PMN-PT, or other PZT material.

6. The micro-actuator according to claim 1, wherein notches or spaces exist between the top support and respective side arms of the metal support frame and/or between the bottom support and respective side arms of the metal support frame.

7. The micro-actuator according to claim 1, wherein the metal support frame is mounted to the U-shaped frame by an epoxy.

8. The micro-actuator according to claim 1, wherein the U-shaped frame is constructed of metal or ceramic.

9. The micro-actuator according to claim 1, wherein the U-shaped frame is constructed of metal, and the metal support frame is mounted to the U-shaped frame by laser welding.

10. The micro-actuator according to claim 1, wherein the top support includes a rotatable plate and connection arms that couple the rotatable plate to respective side arms of the metal support frame.

11. A head gimbal assembly comprising:
    a micro-actuator;
    a slider; and
    a suspension that supports the micro-actuator and the slider,
    wherein the micro-actuator includes:
    a U-shaped frame including
        a bottom support,
        a pair of side arms extending from the bottom support, and
        a PZT element mounted to each of the side arms, each PZT element being excitable to cause selective movement of the side arms; and
    a metal support frame including
        a top support that supports the slider,
        a bottom support connected to the suspension, and
        a pair of side arms that interconnect the bottom support and the top support,
    wherein the metal support frame is mounted to the U-shaped frame such that the side arms of the metal support frame are mounted to respective side arms of the U-shaped frame and the bottom support of the metal support frame is mounted to the bottom support of the U-shaped frame.

12. The head gimbal assembly according to claim 11, wherein the bottom support of the metal support frame includes an extended step structure that is adapted to be connected to the suspension, the extended step structure constructed and arranged to maintain a substantially constant gap between the top support and the suspension in use.

13. The head gimbal assembly according to claim 12, wherein the extended step structure is sandwiched between the U-shaped frame and the suspension.

14. The micro-actuator according to claim 11, wherein the PZT elements are mounted to outwardly facing surfaces of respective side arms of the U-shaped frame, and the side arms of the metal support frame are mounted to inwardly facing surfaces of respective side arms of the U-shaped frame.

15. The head gimbal assembly according to claim 11, wherein each PZT element is a ceramic PZT, a thin-film PZT, PMN-PT, or other PZT material.

16. The head gimbal assembly according to claim 11, wherein notches or spaces exist between the top support and respective side arms of the metal support frame and/or between the bottom support and respective side arms of the metal support frame.

17. The head gimbal assembly according to claim 11, wherein the metal support frame is mounted to the U-shaped frame by an epoxy.

18. The head gimbal assembly according to claim 11, wherein the U-shaped frame is constructed of metal or ceramic.

19. The head gimbal assembly according to claim 11, wherein the U-shaped frame is constructed of metal, and the metal support frame is mounted to the U-shaped frame by laser welding.

20. The head gimbal assembly according to claim 11, wherein the top support includes a rotatable plate and connection arms that couple the rotatable plate to respective side arms of the metal support frame.

21. A disk drive device comprising:
a head gimbal assembly including a micro-actuator, a slider, and a suspension that supports the micro-actuator and slider;
a drive arm connected to the head gimbal assembly;
a disk; and
a spindle motor operable to spin the disk,
wherein the micro-actuator includes:
a U-shaped frame including
   a bottom support,
   a pair of side arms extending from the bottom support, and
   a PZT element mounted to each of the side arms, each PZT element being excitable to cause selective movement of the side arms; and
a metal support frame including
   a top support that supports the slider,
   a bottom support connected to the suspension, and
   a pair of side arms that interconnect the bottom support and the top support,
wherein the metal support frame is mounted to the U-shaped frame such that the side arms of the metal support frame are mounted to respective side arms of the U-shaped frame and the bottom support of the metal support frame is mounted to the bottom support of the U-shaped frame.

* * * * *